April 15, 1969     J. R. WETCH ET AL     3,438,432
PLASTIC HEAT EXCHANGER WITH ANTIBUOYANCY MEANS
Filed June 26, 1967
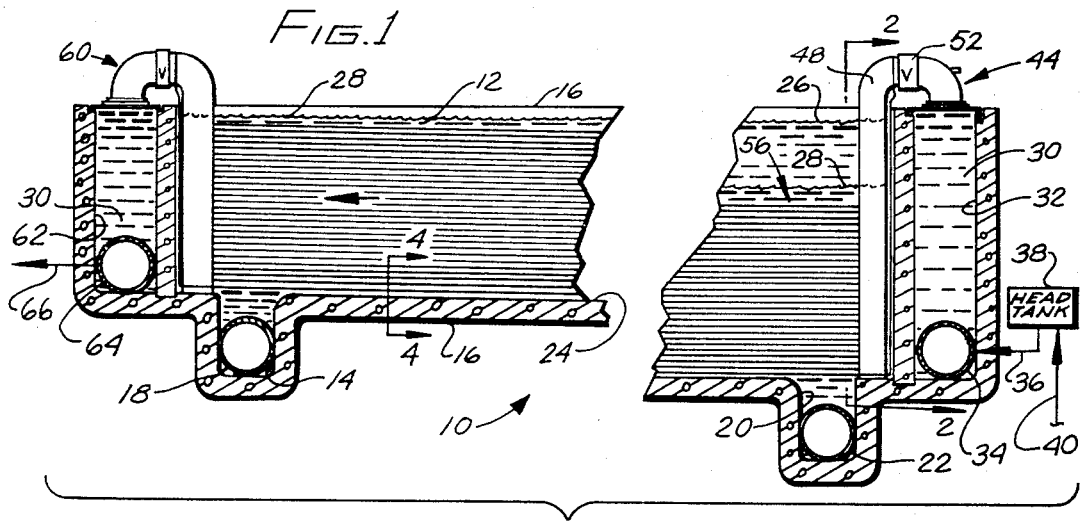
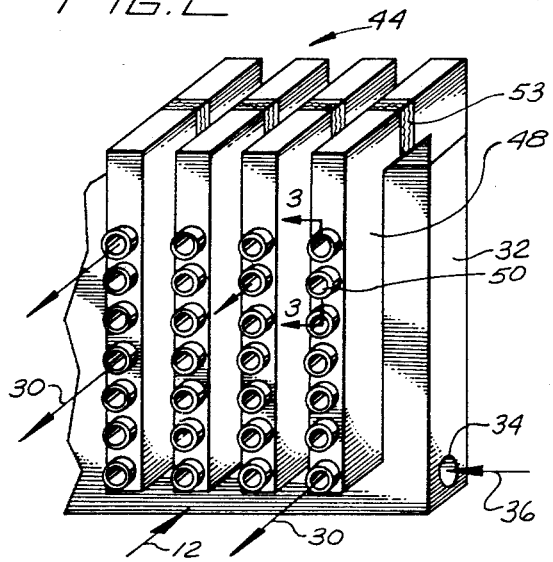
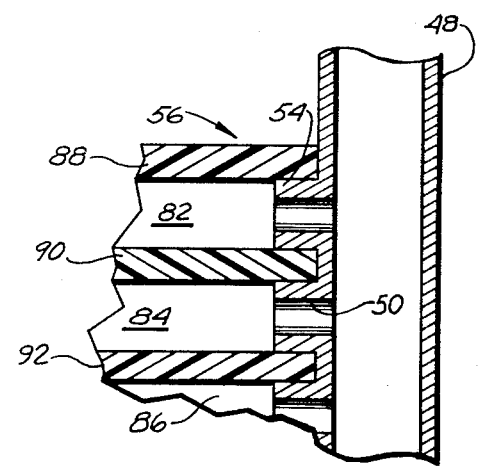
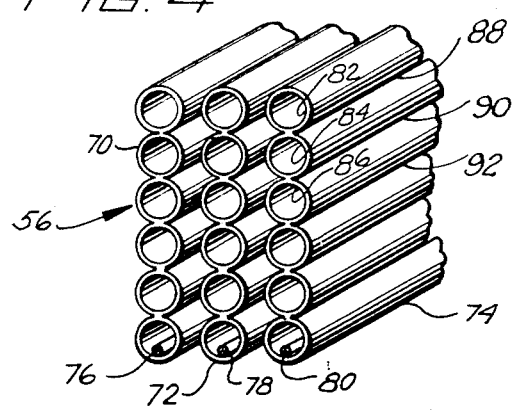
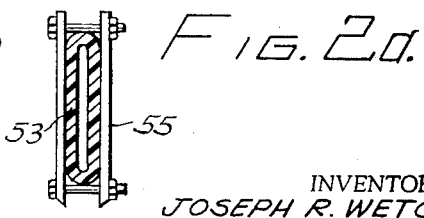
INVENTORS
JOSEPH R. WETCH
LOUIS BERNATH
BY Donald J. Ellingsberg United States Patent Office 3,438,432
Patented Apr. 15, 1969

3,438,432
PLASTIC HEAT EXCHANGER WITH ANTI-BUOYANCY MEANS
Joseph R. Wetch, Sherman Oaks, and Louis Bernath, Canoga Park, Calif., assignors to North American Rockwell Corporation, a corporation of Delaware
Filed June 26, 1967, Ser. No. 648,581
Int. Cl. F28f 1/00
U.S. Cl. 165—138          7 Claims

ABSTRACT OF THE DISCLOSURE

A heat exchanger that passes a product fluid under a developed pressure head through a system of heat exchange tubes in counterflow to a feed fluid that passes by gravity induced flow through a tank in which the heat exchange tubes are immersed. The heat exchange tubes are plastic and have a weight within them to cause neutral buoyancy.

*Background of the invention*

Distillation systems that convert, for example, raw sea water to fresh water, use heat exchangers to recover at least a portion of the heat added to the fresh water during the operation of the system. One of several known distillation systems that requires a heat exchanger is the vapor reheat process with direct condensation. The basic principle of the vapor reheat process is the flash evaporation of a feed fluid such as raw sea water and the direct condensation of the resulting feed vapor in a product fluid such as fresh water. Heat is added to the raw sea water before the sea water enters the flashing stage. In the flashing stage, and in subsequent flashing stages when these are used, the sea water loses a portion of the added heat to the fresh water as the vapor condenses in the water. It is desirable to recover this added heat so that the thermal economy and thereby the overall efficiency of the distillation system is increased.

Conventional heat exchangers can recover some of the added heat from the fresh water. However, this is not without problems. One problem is the contamination of the fresh water by the raw sea water if there is a system leak in such a heat exchanger since the pressure on the sea water is higher than the pressure on the fresh water side. Another problem is the sensitivity of the heat exchanger performance to scale build-up, a consequence of the otherwise low thermal impedance in these heat exchangers due to the high fluid velocities employed. This means that the heat transfer surface area must be significantly oversized to provide for the significant percent increase in thermal impedance due to scale build-up. Since the tubing used for the heat exchangers is generally formed from an alloy of copper and nickel—critical materials that are in short supply which is reflected by their rising cost—the heat exchanger tubing represents nearly 50 percent of the capital cost of a distillation system. This last problem makes distillation systems economically noncompetitive in all but remote arid regions.

As for the problem of scale build-up, conventional distillation systems treat raw sea water to reduce but not eliminate scale build-up in the heat exchange tubing. This treatment can include, inter alia, the addition of suitable chemicals to the raw sea water. The use of these chemicals increases the operating costs of the distillation system and, therefore, further contributes toward making the system economically less competitive.

Plastic films have been proposed for use in heat exchangers.[1] Their cost is substantially less than metal exchangers: cents per square foot compared to dollars per square foot; and their flexibility during operation provides a self-descaling process that substantially reduces scale build-up on the heat exchange surfaces.

Although plastic films provide solutions for several of the problems experienced by metal heat exchangers, plastic films have several limitations that have, prior to the present invention, restricted their serious consideration for use in distillation systems. One limitaton of known plastic films is the inability to resist a continuous pressure, under certain combinations of pressure and temperature, applied normal to the surface of the film without the film experiencing permanent distortion. The applied pressure develops stress levels in the film that cause the film to creep or distort. Therefore, stress levels in the plastic film should be substantially reduced or eliminated so that a plastic film heat exchanger experiences little, if any, creep.

Accordingly, it is an object of the invention to provide a new and improved heat exchanger.

An object of the invention is to provide a new and improved plastic film heat exchanger.

Another object is to provide a plastic film heat exchanger that substantially reduces or eliminates undesirable creep of the plastic film.

A further object is to provide a heat exchanger unit for a distillation system that is economical yet has an increased heat exchange surface area and has an increased operating life.

Another object of the invention is to provide a heat exchanger that eliminates contamination of a first fluid by a second fluid.

Still another object is to provide a heat exchanger that operates efficiently even with a relatively large scale build-up on the heat exchange surfaces.

*Summary of the invention*

Briefly, in accordance with the invention, a new and improved heat exchanger is provided which is particularly suited for use as a unit in a distillation system. The heat exchanger unit in one embodiment passes a product fluid that is under a developed pressure head through a system of heat exchange tubes formed from a flexible material such as plastic film in counterflow to a feed fluid that passes by gravity-induced flow through a tank in which the heat exchange tubes are immersed and maintained by suitable anti-buoyancy means at substantially zero static head stress. The increased surface area of the heat exchanger permits lower fluid velocities so that any scale build-up can be tolerated to a greater degree. Further, a leak in any of the heat exchange tubes will not contaminate the product fluid since the pressurized product fluid will pass through the leak into the feed fluid.

Further objects, features, and the attending advantages of the invention will become apparent when the following description is read in connection with the accompanying drawing.

*Brief description of the drawing*

FIGURE 1 is an elevation, partly in section, of one form of heat exchanger unit of the invention;

FIGURE 2 is a fragmentary perspective view of the unit of FIGURE 1, selected portions removed for clarity, along the line 2—2;

FIGURE 2a is a sectional view of one form of control valve usable with the heat exchanger unit of FIGURE 2;

FIGURE 3 is an enlarged section, with the selected portions included partly broken away, along the line 3—3 as shown by FIGURE 2; and FIGURE 4 is a fragmentary perspective view of the unit of FIGURE 1 along the line 4—4.

---
[1] J. M. Weaver, "Platic Film Heat Exchangers," Chemical Engineering Progress, 56, 49–51 (July 1960).

Description of one embodiment

Referring to FIGURE 1, the heat exchanger unit 10 is shown in one form that can find particular use in a distillation system; for example, a vapor reheat process with direct condensation where it is desirable to recover a portion of the heat absorbed by a product fluid such as fresh water and use this recovered heat to increase the temperature of a feed fluid such a raw sea water. A feed fluid 12 is fed into an inlet sump 14 of tank or pool 16 through an inlet conduit 18 from a suitable feed source (not shown). The feed fluid flows from the inlet sump 14 to an outlet sump 20 of the tank 16 by gravity-induced flow (the floor 24 of the tank 16 slopes, e.g., one foot in 100 feet) where the feed fluid is withdrawn from the outlet sump 20 through an outlet conduit 22. When the heat exchanger unit 10 is used in a distillation system, the feed fluid 12 has a start-up level in the tank 16 as schematically shown at 26 and has a preferred operating level as shown at 28.

A product fluid 30 such as fresh water is fed into an inlet plenum 32 of tank 16 through an inlet port 34 that is connected to an inlet conduit 36. The product fluid 30 is under a pressure head that is developed by a conventional pump and/or head tank schematically represented generally at 38. The pump and/or head tank 38 is connected to the inlet port 34 by inlet conduit 36 and to a source of product fluid (not shown) by conduit 40.

The product fluid 30 passes from the inlet plenum 32 into an inlet header bundle 44 that is formed from a plurality of similar inlet headers, such as inlet header 48. A fragmentary portion of the bundle of inlet headers 44 with similar inlet headers, such as inlet header 48, is shown by FIGURE 2. Inlet header 48 is suitably connected to inlet plenum 32 and directs the pressurized product fluid to a plurality of similar outlet ports, such as outlet port 50 formed in the tube sheet of the inlet header. The outlet ports 50 are suitably spaced along the substantially vertical axis of inlet header 48. Referring to FIGURE 3, each outlet port 50 can be suitably formed into an extension 54 to facilitate the attachment of separate banks of heat exchanger passages, such as heat exchanger tubes 56 as will be described.

Referring again to FIGURE 1, the product fluid 30 passes from the bundle of inlet headers 44 through the heat exchanger tubes 56 and through a bundle of outlet headers 60 that is similar to the inlet headers, into an outlet plenum 62, and finally discharges through an outlet port 64 into a system conduit 66. The pressurized flow of product fluid through each inlet header 48 and outlet header 60, if desired, can be controlled by a conventional control valve 52; for example, a flexible area 53 for the clamping engagement of a pinchcock or pinch valve clamp 55 as shown by FIGURES 2 and 2a. Other conventional valves can also be used with the inlet and outlet headers.

Referring to FIGURE 4, the heat exchanger tubes 56 can be arranged in a plurality of similar tube banks such as tube banks 70, 72, and 74. The tube banks are suitably formed so that each tube bank consists of a plurality of similar fluid passages or tubes arranged in an integral and adjacent array. The tube banks, e.g., 70, 72, and 74, can be positioned vertically as shown, or they can be positioned horizontally, or at some other desired physical orientation. Each fluid passage or tube of a tube bank, that is, each tube of the heat exchanger tubes 56, is suitably connected by bonding, an adhesive, clamping, or the like, at each tube end to an associated extension 54 of the respective tube sheets of the inlet header bundle 44 and the outlet header bundle 60.

Each of the tube banks, such as tube banks 70, 72, and 74, as shown by FIGURE 4, of heat exchanger tubes 56 are formed in the embodiment shown from two films or sheets of flexible material, for example, sheets of polyvinyl fluoride plastic, that are heat sealed together by a conventional heat sealing process at spaced intervals along a major dimension to form a plurality of fluid passages or tubes that are integral and adjacent. For example, tube bank 74 in FIGURE 4 is fabricated from two sheets of plastic film heat sealed together as described to form similar longitudinally extending product tubes, such as tubes 82, 84, and 86. Tubes 82, 84, and 86 are shown in section by FIGURE 3 with the heat-sealed intervals or joints 88, 90, and 92 therebetween.

It is contemplated that the tube banks can be formed as described but with the addition of a flexible inlet header and outlet header at each end of the tube banks functionally similar to inlet header 48, that would be suitably connected to the respective inlet and outlet plenums 32 and 62.

In the heat exchanger unit 10 as particularly shown by FIGURES 1 and 4, the longitudinally extending, vertically aligned plastic film tube banks, such as tube banks 70, 72, and 74, are immersed in the feed fluid 12 that flows through tank 16. Prior to immersion, the plastic film tube banks experience stress levels that are substantially reduced or eliminated when the tube banks are immersed because of the buoyancy of the tube banks. When the product fluid 30 fills the passages or tubes, such as tubes 82, 84, and 86, of the tube banks and the product fluid has a lower density than that of the external feed fluid 12, the tube banks, i.e., the heat exchanger tubes 56, are acted upon by a buoyant force. Since the buoyant force may be greater than desired, a suitable weight can cooperate with the heat exchanger tubes, such as rod or wire weights 76, 78, and 80 that can be placed in one or more tubes of selected tube banks, that acts as an anti-buoyancy means to establish substantially neutral buoyancy. Thus, the heat exchanger tubes 56 experience substantially zero static head stress and little, if any, creep.

It is contemplated that the added weight, such as wire weights 76, 78, and 80 as shown by FIGURE 4, can be placed in selected ones or in all of the heat exchanger tubes 56. The wire weights may extend through the longitudinal length of the heat exchanger tubes 56 in the plastic film heat exchanger and be attached at each end to the respective inlet and outlet headers 44 and 60. Such attachment of the wire weights to the inlet and outlet headers provides additional support that is required in handling the long, vertically aligned tube banks. For example, each tube bank in one form of plastic film heat exchanger is approximately 6 feet wide and 650 feet long with 96 similar product passages or tubes, such as tubes 82, 84, and 86, of tube bank 74 as shown by FIGURE 4, each having an internal diameter of ¾ inch. The system of heat exchange tubes 56 develop a tube array that is approximately 6 feet wide, 6 feet high, and 650 feet long. The array of attached wire weights facilitates handling the system of heat exchanger tubes 56, particularly in a breeze. The array of wire weights when suitably attached to the respective inlet and outlet headers also maintains the alignment of the heat exchange tubes 56 in the tank 16 under varying fluid flow conditions during operation of the heat exchanger unit.

When each tube bank is relatively long, i.e., approximately 650 feet as described, the increased heat exchange surface area permits a lower fluid velocity so that any scale build-up on the heat exchange surfaces produces a relatively small change in total system performance. For example, a scale build-up of 1 or 2 mils on a heat exchange surface at low fluid velocity does not alter the system performance of a plastic film heat exchanger; however, heat exchanger tubes that are formed from metal, after a 1 or 2 mil scale build-up, experience a reduced heat transfer capability that approximates 50 percent.

Operatively, product fluid 30 passes through the heat exchanger tubes 56 under pressure while the counterflow feed fluid 12 passes through the tank 16 by gravity. If a leak develops in a tube in a tube bank, the feed fluid 12 does not contaminate the product fluid 30, because the pressurized product fluid flows through the leak into the nonpressurized feed fluid. The failed tube bank, or any tube bank, can be closed to the flow of product fluid by the respective control valve 52, and subsequently removed and replaced if required. Thus, a distillation system using the improved heat exchanger unit 10 of the invention can continue to operate with one or several leaks without contaminating the product fluid.

As will be evidenced from the foregoing description, certain aspects of the invention are not limited to the particular details of construction as illustrated, and it is contemplated that other modifications and applications will occur to those skilled in the art. It is, therefore, intended that the claims shall cover such modifications and applications that do not depart from the true spirit and scope of the invention.

We claim:
1. A heat exchanger for passing a feed fluid and a pressurized product fluid in a heat transfer relationship, the heat exchanger comprising:
  (a) tank means having an inlet and an outlet and passing the feed fluid from the inlet to the outlet,
  (b) a plastic heat exchange tube means cooperating with said tank means and generally immersed in the feed fluid,
  (c) inlet header means and outlet header means in fluid communication with and spaced apart by said heat exchange tube means, and
  (d) an antibuoyancy means cooperating with said tube means and establishing substantially neutral buoyancy so that said tube means experiences substantially zero static head stress,
  (e) said heat exchange tube means passing the product fluid from said inlet header means to said outlet header means so that a desired heat transfer is accomplished between the product fluid and the feed fluid without contamination of the product fluid by the feed fluid.

2. The heat exchanger of claim 1 in which said heat exchanger tube means is a plurality of adjacent tube banks connected in fluid communication with said spaced-apart inlet and outlet header means.

3. The heat exchanger of claim 1 in which each of said tube banks is suitably formed from at least first and second sheets of plastic film joined at spaced intervals to define a plurality of fluid passages in said tube bank that are integral and adjacent.

4. The heat exchanger of claim 3 in which said antibuoyancy means is a weight cooperating with said tube banks.

5. The heat exchanger of claim 4 in which said weight is a wire positioned in selected ones of said fluid passages and suitably connected to said inlet and outlet header means.

6. The heat exchanger of claim 1 in which said tube banks are suitably arranged in a substantially vertical array having said fluid passages in a generally horizontal relationship with said tank means.

7. The heat exchanger of claim 1 in which selective ones of said inlet and outlet header means include a control means so that the passing of the product fluid through said heat exchange tube means is selectively controlled.

References Cited

UNITED STATES PATENTS

| 2,779,573 | 1/1957 | Kuroda | 165—157 X |
| 3,228,456 | 1/1966 | Brown et al. | 165—180 X |
| 3,233,662 | 2/1966 | Yuen | 165—46 |
| 3,239,000 | 3/1966 | Meagher | 165—180 X |

FOREIGN PATENTS

| 1,075,477 | 4/1954 | France. |
| 1,252,631 | 12/1960 | France. |

ROBERT A. O'LEARY, *Primary Examiner.*

ALBERT W. DAVIS, *Assistant Examiner.*

U.S. Cl. X.R.

165—157, 180, 96, 178; 202—235; 203—10, 86